Feb. 25, 1930.  H. W. ALDEN ET AL  1,748,747
CAR TRUCK
Filed May 31, 1929  3 Sheets-Sheet 3
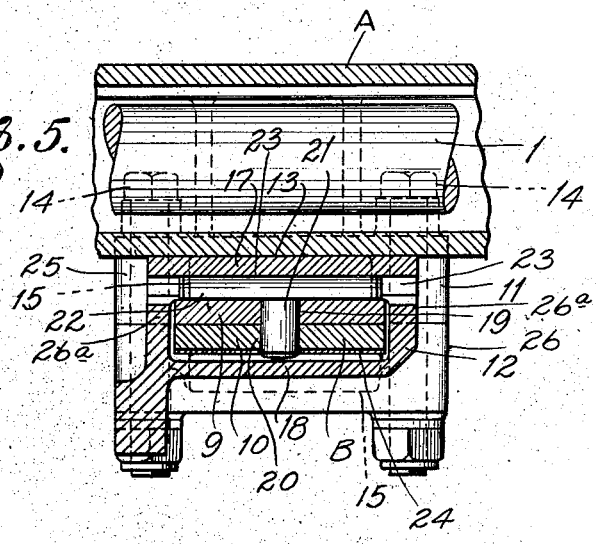
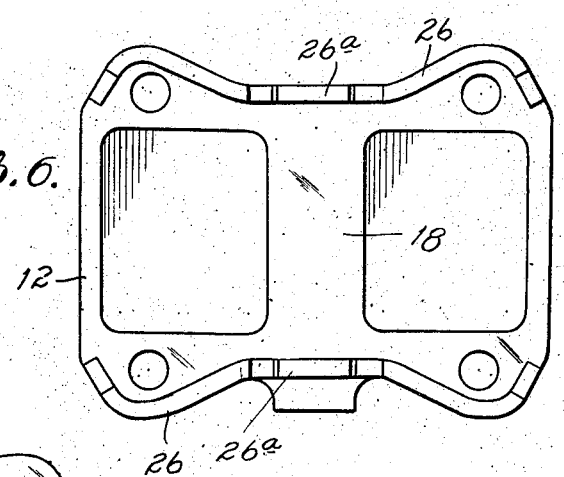
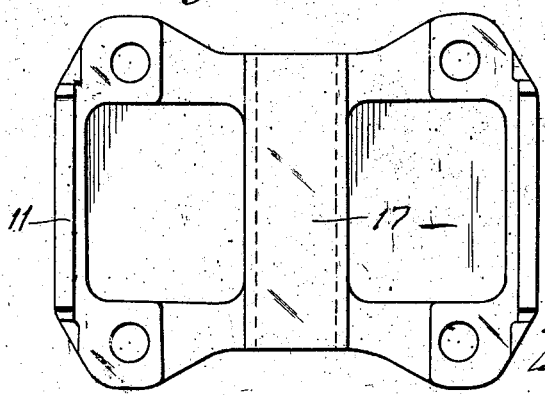
INVENTORS
THEIR ATTORNEYS Patented Feb. 25, 1930

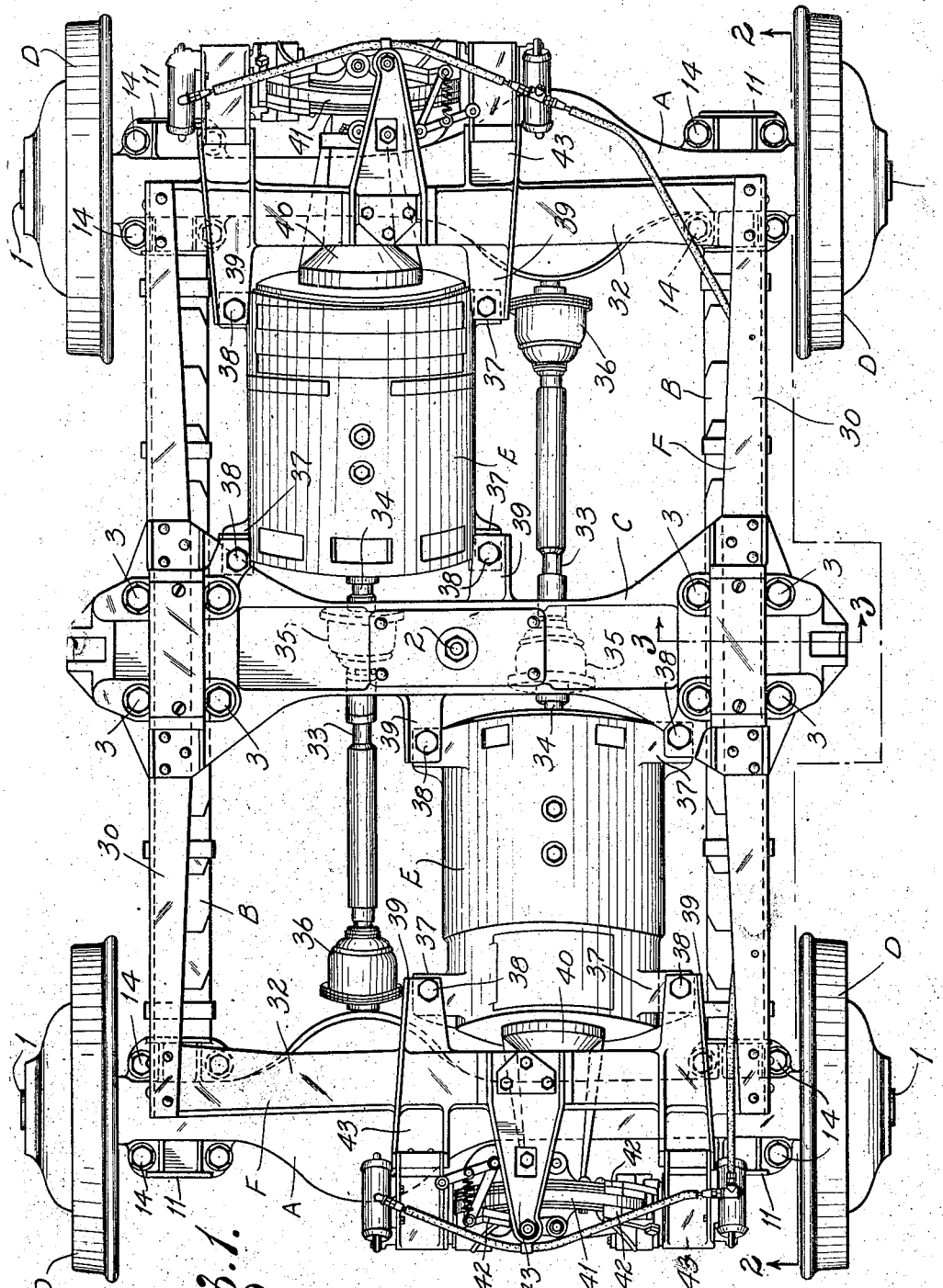

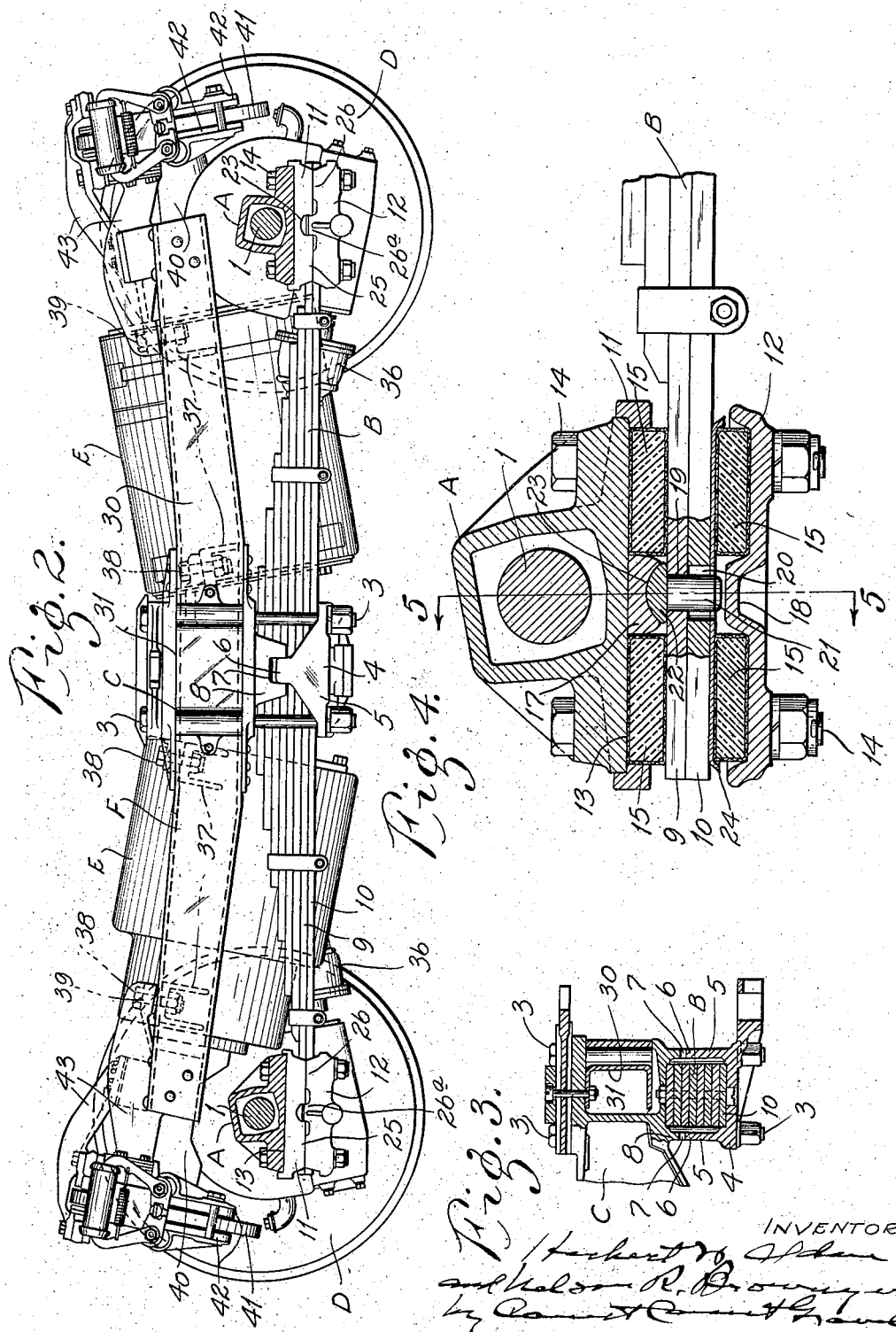

1,748,747

UNITED STATES PATENT OFFICE

HERBERT W. ALDEN AND NELSON R. BROWNYER, OF DETROIT, MICHIGAN, ASSIGNORS TO THE TIMKEN-DETROIT AXLE COMPANY, OF DETROIT, MICHIGAN, A CORPORATION OF OHIO

CAR TRUCK

Application filed May 31, 1929. Serial No. 367,343.

This invention relates to trucks, and more particularly to street car trucks of the kind having two motor driven axles enclosed in axle housings that are connected together at their corresponding ends by body-supporting leaf springs. Its principal objects are to provide connections between the springs and the axle housings which will resist the driving and braking torque exerted on the axle housings, and which will permit elongation and flexing of said springs relative to the axle housings. Another object is to provide an improved motor and brake support. Other objects are to reduce the unsprung weight of the truck, to deaden noise and to minimize jarring and jolting. The invention consists in the truck, and in the parts and arrangements of parts hereinafter described and claimed.

In the accompanying drawings, which form part of the specification and wherein like symbols refer to like parts wherever they occur, Fig. 1 is a plan view of a truck embodying our invention, Fig. 2 is a vertical longitudinal section on the line 2—2 of Fig. 1, Fig. 3 is a vertical transverse cross-section on the line 3—3 in Fig. 1, Fig. 4 is a vertical section through the yielding connection between one end of a spring and adjacent axle housing, Fig. 5 is a vertical section on the line 5—5 in Fig. 4, Fig. 6 is a top plan view of one of the lower spring seats; and Fig. 7 is a similar view on one of the upper spring seats.

The present truck comprises two axle housings A, semi-elliptic longitudinal side springs B connecting the corresponding ends of said axle housings, and a rigid truck bolster C connecting said side springs about midway of their length. Rail wheels D are secured to axle shaft sections 1 rotatably mounted in the axle housings A and are operatively connected by differential mechanisms (not shown) interposed between them. The truck bolster C is provided at its center with a suitable center pin or king bolt 2 of a suitable center bearing (not shown) on which the car body is supported and about which the truck swivels.

Each end of the truck bolster C is supported on and rigidly clamped to the side spring B located therebelow by means of vertical clamping bolts 3 which extend through alined openings in said truck bolster and in a saddle block 4 located beneath said spring. This saddle block is provided with upstanding side flanges 5 which terminate at their upper ends in tongues 6 that fit within downwardly opening grooves or notches 7 provided therefor in lugs 8 that project downwardly from the bolster on opposite sides of the spring.

Each side spring B comprises a series of leaves superposed one upon the other, the two lower leaves 9 and 10 being long leaves of substantially the same length and the remaining leaves being regularly shortened or graduated from top to bottom. At each end of each side spring the two long lower leaves 9 and 10 thereof extend beneath the end of the axle housing located adjacent thereto and are secured to said housing by means of a connection or fitting comprising two cooperating spring seats 11 and 12 located one above and the other below the projecting ends of said leaves. The upper spring seat 11 is interposed between the upper leaf 9 and a flat seat 13 provided therefor on the underside of the axle housing; and the lower spring seat 12 fits under the lower leaf 10. The upper and lower spring seats 11 and 12, with the ends of the two long lower leaves 9 and 10 of the spring disposed therebetween, are secured to the underside of the axle housing by means of four vertical bolts 14 which pass through alined apertures provided therefor in the axle housing and in the four corners of said spring seats.

The spring opposing faces of the upper and lower spring seats 11 and 12 are provided on opposite sides of the longitudinal center line of the axle to which they are secured with recesses adapted to receive rectangular blocks 15 of rubber or other nonmetallic material. The two rubber blocks seated in the upper spring seat 11 are separated by means of a cross member or bar 17 that extends from side to side of said spring seat crosswise of the side spring; and the lower spring seat 12 is likewise provided with a cross-rib or member 18 for separating the lower pair of rubber blocks. Extending through a circular hole 19 in the upper leaf 9 and an elongated slot 20 in the lower leaf 10 at about the center of the spring seats is a dowel or stud 21. The dowel pin 21 is provided at its upper end with a laterally extending cross-head or bar 22 which fits within a longitudinal groove 23 in the underside of the cross bar 17 of the upper spring seat 11. The groove 23 has a transversely curved concave surface, and the cross-bar 22 of the dowel pin 21 has a transversely curved convex upper surface adapted to fit the curved surface of said groove. The dowel pin has a snug fit in the hole 19 in the upper leaf 9; and the slot 20 in the lower leaf 10 is elongated lengthwise of the spring to permit relative movement between said pin and said lower leaf longitudinally of the latter.

The rubber blocks are preferably provided with a canvas covering to prevent excess flow of the rubber under load. A thin plate 24, preferably of brass, is interposed between the opposing surfaces of the lower leaf 10 and the lower pair of rubber supporting blocks for the purpose of securing an easy sliding movement of said leaf relative to said blocks. The amount of compression applied to the rubber blocks when the bolts are tightened is limited by abutting flanges 25 and 26 at the sides of the upper and lower spring seats 11 and 12, respectively. The side flanges 26 of the lower spring seat are provided with tongues 26$^a$ that fit within the ends of the groove 23 in the upper spring seat and thus serve to properly position the two seats with respect to each other.

In the present arrangement, the axle shaft sections 1 of the two differential driving axles are driven by means of separate driving motors, preferably electric motors E, supported in a rectangular frame F located above the axle housings A and the longitudinal side springs B which connect them together. The motor supporting frame comprises side rails 30 of substantially channel-shaped section with their webs disposed vertically and with their top and bottom flanges extending inwardly. The side rails 30 of the motor supporting frame are supported intermediate their ends in outwardly opening recesses 31 provided therefor in the ends of the truck bolster C, the flanges of said side rails being riveted or otherwise rigidly secured to the bolster. The side rails 30 of the motor supporting frame are connected together at their ends by end members 32 of substantially inverted channel-shaped cross section.

The two driving motors E are preferably arranged on opposite sides of the truck bolster C and are also preferably arranged on opposite sides of the longitudinal center line of the truck. Each motor lies between the truck bolster C and one of the axles; and such motor is operatively connected to drive the other axle, that is, the axle that is more distant from it. For this purpose, the outer end of the motor is tilted higher than the inner end thereof, and the worm shaft that is driven thereby is also tilted so that its inner end is higher than its outer end and at about the same angle as the motor. The proper inclination is such that the transmission shaft 33, which is connected to the armature shaft 34 of the motor and to the worm shaft by universal joints 35 and 36, will normally lie in the same line with them. By this arrangement, the up-and-down movement of the side springs and the bolster and motor frame supported thereby will be readily accommodated by slight movement of the universal joints that will not disturb the operation of the system.

Each motor is partly suspended from the truck bolster C and the adjacent end member 32 of the motor supporting frame F; and for this purpose the outer and inner end portions of said motors are provided with perforated lugs 37 at their sides adapted to be secured by bolts 38 to similar outstanding lugs 39 on said bolster and on the end members of said motor supporting frame. The armature shaft 34 of each motor extends beyond the outer or commutator end thereof and is housed within a tubular housing or extension 40 that is bolted or otherwise rigidly secured to said end of said motor. The armature shaft extends beyond the outer end of the housing therefor and has a brake disk 41 mounted thereon for rotation therewith. Suitable brake shoes 42 are supported on outstanding lugs or brackets 43 on the end members 32 of the motor supporting frame and cooperate with the brake disk. This construction of armature shaft brake forms no part of the present invention and it is considered unnecessary to illustrate or describe it in detail.

The foregoing car truck has numerous advantages. The side springs serve to properly position the axles relative to each other and also absorb all driving and braking torque reactions. The cushioned connections between the springs and the axle housings permit the springs to flex in all directions; and they also serve to cushion the rail vibrations, and thus deaden noise and minimize jarring and jolting. The dowel pins can oscillate in the upper spring seats as the rubber blocks distort slightly due to the torque strains on the axle housings and also when spring deflection occurs. The slot-and-pin connections between the dowel pins and the spring leaves 10 permit relative longitudinal sliding movement of the leaves 10 with respect to the leaves 9 and spring seats; and they also permit tilting movement of the portions of said leaves located between the spring seats without bending said leaves where they enter said spring seats.

It is noted that as another important advantage of the foregoing construction that the driving motors and brakes are entirely sprung; that is, the motors and brakes are spring-supported with relation to the axle housings so as to allow relative independent movement therebetween. It is also noted that the unsprung weight is extremely low, consisting only of the driving axles and wheels and one half of the weight of the propeller shafts.

Obviously, the hereinbefore described construction admits of considerable modifications without departing from the invention. Therefore, I do not wish to be limited to the precise construction shown and described.

What we claim is:

1. A vehicle truck comprising axle housings, leaf springs connecting said housings, a member connecting said leaf springs, spring seats secured to said housings and adapted to receive the adjacent ends of the leaf springs therebetween, and flat nonmetallic cushioning blocks mounted in said spring seats above and below the portions of the springs cooperating therewith.

2. A vehicle truck comprising axle housings, leaf springs connecting the corresponding ends of said housings, a bolster connecting the middle portions of said springs, and a connection between each end of each spring and the adjacent end of an axle housing, said connection comprising upper and lower spring seats secured to each other and to the axle housing and adapted to receive the end of said spring, and non-metallic cushioning blocks interposed between said end of said spring and the lower spring seat and the bottom of the axle housing.

3. A vehicle truck comprising axle housings, leaf springs connecting the corresponding ends of said housings, a bolster connecting the middle portions of said springs, and a connection between each end of each spring and the adjacent end of an axle housing, said connection comprising upper and lower spring seats secured to each other and to the bottom of the axle housing and adapted to receive the end of said spring therebetween, nonmetallic cushioning blocks interposed between said end of said spring and the lower spring seat and the bottom of the axle housing, and a stud extending through said end of said spring with one end seated in a recess provided therefor in one of said spring seats.

4. A vehicle truck comprising axle housings, leaf springs connecting the corresponding ends of said housings, a bolster rigidly connecting the middle portions of said springs, means for securing the end portions of said springs to said axle housings, said means comprising upper and lower spring seats secured to each other and to the bottom of the axle housing and adapted to receive the end of said spring therebetween, nonmetallic cushioning blocks interposed between said end of said spring and the lower spring seat and the bottom of the axle housing, a stud extending through the portion of the spring engaged with said spring seats, and means on one end of said stud cooperating with means on one of said spring seats for permitting rocking movement of said stud in directions transverse to said axle housing.

5. A vehicle truck comprising axle housings, leaf springs connecting the corresponding ends of said housings, a bolster, means for securing the middle portions of said springs to the ends of said bolster, and means for securing the end portions of said springs to the bottoms of said axle housings, said last mentioned means comprising an upper spring seat fitting against the bottom of a housing, a lower spring seat below said upper spring seat, nonmetallic cushioning blocks interposed between said spring and the lower spring seat and the bottom of the axle housing, means for securing said seats together and to said axle housing, a stud extending through vertical openings in the portions of the spring engaged by said spring seats, and means on one end of said stud cooperating with means on an adjacent spring seat for permitting rocking movement of said stud in directions transverse to said axle housing.

6. A vehicle truck comprising axle housings, leaf springs connecting the corresponding ends of said housings, a bolster connecting the middle portions of said springs, means for securing each end of each spring to the adjacent end of an axle housing, said means comprising upper and lower spring seats disposed beneath said axle and adapted to receive the ends of the two lower leaves of said spring, nonmetallic cushioning blocks clamped between said leaves and the lower spring seat and the bottom of said axle housing, and a stud extending through registering openings in the ends of the two lower leaves of said springs and having rocking engagement with one of said spring seats, the opening in one of said leaves snugly fitting said stud and the opening in the other of said leaves being elongated lengthwise of the spring.

7. A vehicle truck comprising axle housings, leaf springs connecting said housings, a bolster connecting said leaf springs, spring seats secured to said housings and adapted to receive the adjacent end of a leaf spring therebetween, the spring opposing face of one of said seats having a groove therein extending transversely of said spring, flat nonmetallic cushioning blocks mounted in said spring seats above and below the portion of the spring cooperating therewith, and a stud extending through said portion of said spring and provided with a cross-head having a bearing in the groove in one of the spring seats.

8. A vehicle truck comprising axle housings, leaf springs connecting said housings, a bolster connecting said leaf springs, upper and lower spring seats secured together and to said housings and adapted to receive the adjacent end of a leaf spring therebetween, the under side of the upper spring seat being provided with a groove extending transversely of said spring, flat nonmetallic cushioning blocks mounted in said spring seats above and below the portion of the spring cooperating therewith, and a stud extending vertically through said portion of said spring and provided at its upper end with a cross-head fitting the groove in said upper spring seat.

9. A vehicle truck comprising axle housings, leaf springs connecting the corresponding ends of said housings, a bolster connecting the middle portions of said springs, and a connection between each end of each spring and the adjacent end of an axle housing, said connection comprising upper and lower spring seats secured to each other and to the bottom of the axle housing and adapted to receive the ends of the two lower leaves of said spring, nonmetallic cushioning blocks interposed between said leaves and the lower spring seat and the bottom of the axle housing, one of said seats being provided in its spring opposing face with a groove extending transversely of said spring, and a stud extending through registering openings provided therefor in said leaves and having a cross-head seated in said groove.

10. A vehicle truck comprising axle housings, leaf springs connecting the corresponding ends of said housings, a bolster connecting the middle portions of said springs, and a connection between each end of each spring and the adjacent end of an axle housing, said connection comprising upper and lower spring seats secured to each other and to the bottom of the axle housing and adapted to receive the ends of the two lower leaves of said spring, nonmetallic cushioning blocks interposed between said leaves and the lower spring seat and the bottom of the axle housing, one of said seats being provided in its spring opposing face with a groove extending transversely of said spring, and a stud extending through registering openings provided therefor in said leaves and having a cross-head seated in said groove, said stud having a snug fit in opening in one leaf and a loose fit in the opening in the other leaf.

11. A vehicle truck comprising axle housings, leaf springs connecting the corresponding ends of said housings, a bolster connecting the middle portion of said springs, means for securing each end of each spring to the adjacent end of an axle housing, said means comprising upper and lower spring seats disposed beneath said axle and adapted to receive the ends of the two lower leaves of said spring, said seats having side flanges disposed in abutting relation, a plurality of nonmetallic cushioning blocks clamped between said leaves and the lower spring seat and the bottom of said axle housing, and a stud extending through registering openings in the ends of the two lower leaves of said spring and having rocking engagement with the upper spring seat, the opening in the upper leaf snugly fitting said stud and the opening in the lower leaf being elongated lengthwise of the spring.

12. A vehicle truck comprising axle housings, leaf springs connecting the corresponding ends of said axle housings, a bolster rigidly connecting the middle portions of said springs, a frame supported intermediate the ends of its side rails on the middle portions of said springs, and motors supported from said bolster and said frame and operatively connected with the respective axle housings.

13. A vehicle truck comprising axle housings, leaf springs connecting the corresponding ends of said axle housings, a bolster, a saddle block rigidly connecting the middle portions of said springs to the bottom of said bolster, and a frame located above said housings and springs, and supported intermediate the ends of its side rails on the middle portions of said springs.

14. A vehicle truck comprising axle housings, leaf springs connecting the corresponding ends of said axle housings, a bolster extending from spring to spring with its ends supported on and secured to the middle portions thereof, and a frame located above said axle housings and springs with its side rails secured to the ends of said bolster.

15. A vehicle truck comprising axle housings, leaf springs connecting the corresponding ends of said axle housings, a frame comprising side rails connected by end rails and a bolster, said bolster having its ends supported on and rigidly secured to the middle portions of said springs, and motors supported on said frame and operatively connected with the respective axle housings.

16. A vehicle truck comprising axle housings, leaf springs connecting the corresponding ends of said axle housings, a frame comprising side rails connected by end rails and a bolster, said bolster having its ends supported on and rigidly secured to the middle portions of said springs, motors supported on said frame and operatively connected with the respective axle housings, and brake mechanism supported on said frame and operatively engaging said motors.

Signed at Detroit, Michigan, this 28th day of May, 1929.

HERBERT W. ALDEN.
NELSON R. BROWNYER.